United States Patent
Kaufleitner

(10) Patent No.: US 10,088,822 B2
(45) Date of Patent: Oct. 2, 2018

(54) METHOD FOR ACTUATING A SAFE SWITCHING ELEMENT OF AN INSTALLATION

(71) Applicant: B&R INDUSTRIAL AUTOMATION GMBH, Eggelsberg (AT)

(72) Inventor: Franz Kaufleitner, Hochburg-Ach (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 49 days.

(21) Appl. No.: 15/121,564

(22) PCT Filed: Feb. 25, 2015

(86) PCT No.: PCT/EP2015/053879
§ 371 (c)(1),
(2) Date: Aug. 25, 2016

(87) PCT Pub. No.: WO2015/128341
PCT Pub. Date: Sep. 3, 2015

(65) Prior Publication Data
US 2016/0370785 A1 Dec. 22, 2016

(30) Foreign Application Priority Data
Feb. 26, 2014 (AT) .............................. A 50145/2014

(51) Int. Cl.
*G06F 17/00* (2006.01)
*G05B 19/10* (2006.01)
(Continued)

(52) U.S. Cl.
CPC ......... *G05B 19/106* (2013.01); *G05B 19/041* (2013.01); *G05B 19/0425* (2013.01);
(Continued)

(58) Field of Classification Search
CPC . G05B 19/106; G05B 19/041; G05B 19/0425
(Continued)

(56) References Cited

U.S. PATENT DOCUMENTS 6,661,653 B1 12/2003 Holmen et al.
2007/0185945 A1 8/2007 Barthel
(Continued)

FOREIGN PATENT DOCUMENTS

EP  18 95 374  3/2008
WO  01/08131  2/2001
(Continued)

*Primary Examiner* — Anthony Brown
(74) *Attorney, Agent, or Firm* — Greenblum & Bernstein, P.L.C.

(57) ABSTRACT

The invention relates to a method for actuating a mode selection switching element of an installation by means of a safe control operation, wherein the installation has a functional controller and communication connections, and wherein the functional controller has a storage unit, a (sequence) control apparatus, a display and a user interface. The method has the following steps: providing a mode-selection actuating element on a user interface; receiving a user input to change the operating mode at the user interface; transmitting the data relating to the change of operating mode to the mode-selection switching element; transmitting the data relating to the change of operating mode from the mode-selection switching element back to the functional controller; checking whether the operating mode of the data which have been transmitted back matches the operating mode selected by the user; transmitting a confirmation to the mode-selection switching element; and changing the operating mode by means of the mode-selection switching element.

10 Claims, 2 Drawing Sheets

Figure 1:
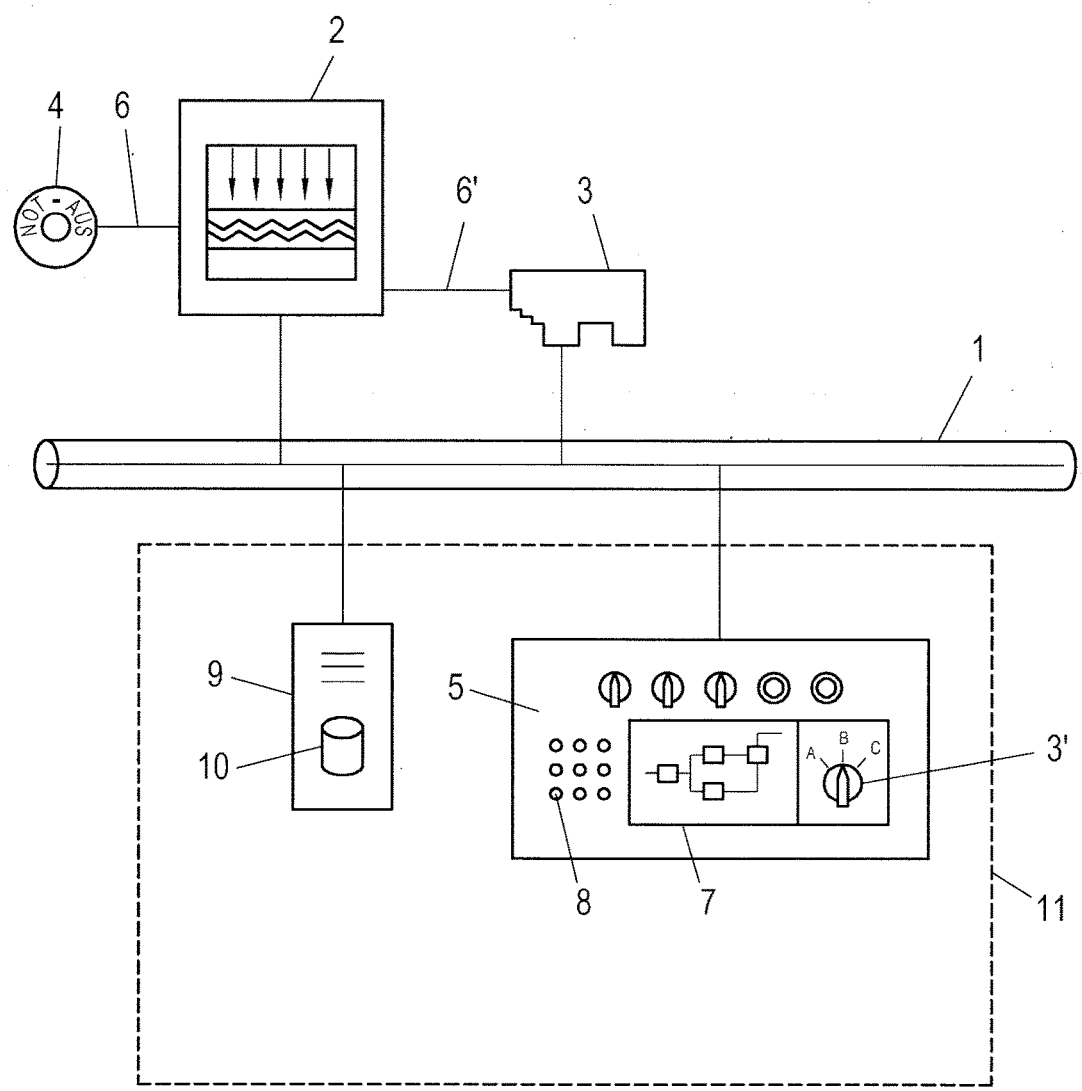

(51) Int. Cl.
*G05B 19/042* (2006.01)
*G05B 19/04* (2006.01)
*G05B 19/409* (2006.01)
*G06F 21/31* (2013.01)

(52) U.S. Cl.
CPC ........... *G05B 19/409* (2013.01); *G06F 21/31* (2013.01); *G05B 2219/25163* (2013.01); *G05B 2219/34316* (2013.01)

(58) Field of Classification Search
USPC .......................................................... 726/17
See application file for complete search history.

(56) References Cited

U.S. PATENT DOCUMENTS

| | | | |
|---|---|---|---|
| 2009/0125760 A1 | 5/2009 | Schlette | |
| 2010/0256785 A1 | 10/2010 | Lloyd | |
| 2011/0069698 A1* | 3/2011 | Schmidt | H04L 12/403 370/351 |
| 2012/0209412 A1 | 8/2012 | Lloyd | |
| 2014/0236321 A1 | 8/2014 | Lloyd | |

FOREIGN PATENT DOCUMENTS

| | | |
|---|---|---|
| WO | 2005/048103 | 5/2005 |
| WO | 2006/053668 | 5/2006 |

* cited by examiner

METHOD FOR ACTUATING A SAFE SWITCHING ELEMENT OF AN INSTALLATION

The invention relates to a method for actuating a mode selection switching element of an installation by means of a safe control operation, wherein the installation has a functional controller and communication connections, and wherein the functional controller has a storage unit, a (sequence) control apparatus, a display and a user interface.

Safety switches perform a personal protection function, where any malfunctions lead to serious injuries to persons. Therefore, special precautions exist for safety switches. For example, safety components should not be circumvented, turned away, removed or rendered ineffective in another way. Furthermore, for example, a switching operation should only be initiated directly and immediately by actuators provided specifically therefor.

In the context of the present description, in particular a control operation which effects a change of the mode of operation of the installation is regarded as a "safe control operation."

Special attention should be paid to the switching for selection of the mode control or mode of operation. The selection of a mode of operation, for example on machines, constitutes a safety function within the meaning of IEC 61508, ISO 13849, or the Machinery Directive 2006/42/EC and should therefore only be carried out with operating means suitable therefore. In this case the switching must take priority over all other control and operating functions except for the emergency stop. If the machine is designed and constructed so that a plurality of modes of control and operation with different protective measures and/or methods of operation are possible, they must be equipped with a control and operating mode selection switch which can be closed in each position. Every position of the selection switch must be clearly recognizable and should only correspond to one control and operating mode. Furthermore, it is necessary that the use of specific functions of the machine can be limited to specific groups of persons. Analogous requirements also exist for other safety switches, such as for instance for two-hand control switches or enabling switches.

Because of this combination of requirements, currently only dedicated devices are used for example for selecting the mode of operation. These devices are usually designed as key switches, and in more modern devices, contactless systems, such as for instance RFID, are also used. As in the case of the emergency off-switch, operating mode selection switches are currently hard-wired in order to circumvent the potentially unsafe interface of the bus communication and to ensure the required prioritization of the switching.

This prior art has several disadvantages. Thus dedicated devices which have their own wiring must be used for operating mode selection switches. Therefore, the apparatus cannot be integrated into the existing machine visualization. Also remote control is not possible. Furthermore, in practice, the problem arises that the safety function is circumvented, as the key can be easily inserted even in the absence of the authorized user.

New-generation machines and other installations usually have a machine or installation visualization which is based on an integrated operating concept and has an access and authentication concept adapted to the requirements of the installation. Because of the requirements set out above it is currently not possible to integrate the selection of the mode of operation into the installation visualization or the access and authentication concept.

According to the invention, these disadvantages are overcome by a method referred to in the introduction which includes the following steps:

providing a mode selection actuating element on a user interface;

receiving a user input to change the operating mode at the user interface;

transmitting the data relating to the change of operating mode to the mode selection switching element;

transmitting the data relating to the change of operating mode from the mode-selection switching element back to the functional controller;

checking whether the operating mode of the data which have been transmitted back matches the operating mode selected by the user;

transmitting a confirmation to the mode selection switching element;

and changing the operating mode by means of the mode selection switching element.

This method makes it possible to control safe switching elements in accordance with standards and without a higher safety risk by means of a bus connection and thus to arrange a corresponding operating mode actuating element without direct wiring to the normal user interface. In the context of the present invention any switching element which, by its actuation, leads to a change of the mode of operation of the installation is regarded as an operating mode switching element.

In an advantageous manner, an operating mode selection switch, a two-hand control switch or an enabling switch can be provided as a mode-selection actuating element, wherein the method according to the invention can be used for all safe circuits in which hard wiring was used in the past, since the actuation thereof effects a change of the mode of operation of the installation. Thus, for example when the two-hand control switch is actuated an installation can be changed from a safe or inactive mode of operation into an active mode of operation, in which the operator must be located at the position defined by the two-hand control switch.

An advantageous embodiment of the invention may include the additional step that upon reception of the user input and/or the confirmation an identity check of the user is carried out. In this way, a circumvention of the safety measures is prevented.

The method can be applied advantageously to an installation in which at least parts of the user interface are displayed as visualization elements on the display, so that the method can also be used with modern operating concepts.

In this context, all elements which are generated with the aid of a computer and can be made visible for the user are designated as "visualization elements" or "visualized elements." This relates in particular to displays on a screen view, for example in the form of so-called "icons," which can be selected or changed for example by a mouse click or by touching a touch-sensitive screen ("touch screen") or in any other way. Visualization elements can also be represented three-dimensionally, such as for instance in a holographic representation or as an element on a 3D screen, and can be selected for example by 3D gesture control.

In a further advantageous embodiment, the mode selection actuating element can also be displayed as a visualized element on the display. This makes it possible for the mode selection actuating element to be made available only for authorized users. For non-authorized users, either the element may not be displayed at all, or it is identified as not selectable by a modified appearance (for example colorless or faint).

In an advantageous embodiment of the method according to the invention, the step of checking may also include the following steps:

displaying a request for confirmation of the user input on the display; and receiving a confirmation from the user on the user interface.

This enables the implementation of safety protocols which require a further confirmation by the user.

In a further advantageous manner, the request for confirmation of the user input may be a visualized element, which is display spatially offset from the mode selection actuating element. As a result the input can be very intuitively designed, as for example for the user after actuation of the operating mode actuating element the same or a similar element (for example in another color or shape) appears at another location on the screen, which must then be actuated again for confirmation of the selection. The communication steps of the method according to the invention run in the background unnoticed by the user. In this way it is also possible to prevent operating mode actuating elements from being inadvertently actuated.

In a further advantageous embodiment an installation, visualization can be displayed on the display. This enables the implementation of very intuitive operating concepts. Moreover, in combination with a user interface integrated in the display, a standardized interface device, for example in the form of a tablet PC, can utilize the entire functionality of the user interface. This makes it possible, even without hardware modifications, to adapt, change or add to the appearance or the functionality of the interface at a later stage.

Advantageously, at least one communication connection can use a bus protocol. Due to the method according to the invention it is possible to transmit safe control commands via a potentially unsafe bus connection. This avoids the requirement for dedicated wiring. Any protocols which are expedient for the respective application can be used as the bus protocol. For the standardized data exchange between bus subscribers in a field bus system, the automation uses for example industrial ethernet protocols, such as for example POWERLINK, Ethernet IP, ProfiNet, Ethercat, etc. For transmission of safety-related data, for example in the context of the international standard IEC 64508 or other safety-related standards, safety protocols are usually used, such as for example OpenSAFETY, ProfiSafe, CIPsafety, Safety over Ethercat, etc. Such ethernet protocols and safety protocols are well known, and for this reason they are not described in greater detail here.

The method according to the invention can be used universally for different installations, such as for example for machines, boiler systems, transport apparatus, power stations or other power supply installations.

Figure 2:
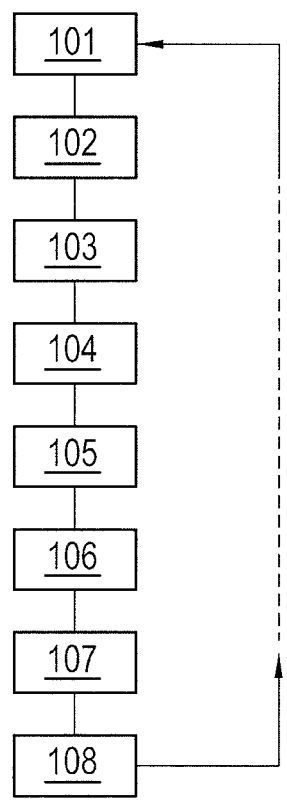

Preferred embodiment of the invention are described in detail below by way of example with reference to the appended drawings, in which FIG. 1 shows a block diagram of an exemplary apparatus with which the method according to the invention can be used, and FIG. 2 shows the steps of the method according to the invention in a flow diagram.

In FIG. 1 an assembly of several elements of an automated production line is illustrated schematically by way of example, wherein the individual components communicate with one another by means of a bus 1. In FIG. 1 a machine 2, an operating mode switching element 3, a computer unit 9 and a control panel 5 are connected to one another by means of the bus 1.

The machine 2 is represented in FIG. 1 by a symbol for a deep drawing press, but it will be understood that the method according to the invention can also be used advantageously with any other machines or installations where it is necessary or desirable to provide a safe control. The machine 2 is connected to an emergency off switch 4, wherein for safety reasons actuation of the emergency off switch 4 is not communicated by means of the bus 1. Therefore the emergency off switch 4 is connected by means of a direct wiring 6 to the machine 2, as is required by the relevant standards and is generally usual.

The operation the machine 2 takes place by means of the control panel 5, which serves as a user interface and generally has a display 7 and operating elements 8, wherein not only the illustrated keypad and switches, but also any other input means, such as for instance a joystick, a trackball, a computer mouse or similar elements, and also combinations thereof, can be used as operating elements. The display 7 and several or all of the operating elements 8 can optionally also be configured as a touch screen operating panel, so that particularly intuitive operating concepts are possible, wherein a machine visualization can also be integrated into the display or the operating panel.

The control unit for the sequence control of the machine 2 can either be integrated into the control panel 5 or it can be designed as a discrete unit, which is advantageous in particular when the sequence control necessitates more complex computing operations, as is necessary for example in the control of CNC cells. In FIG. 1 a discrete computer unit 9 having a storage unit 10 is provided for the sequence control of the machine 2.

In FIG. 1 the control panel 5 and the computer unit 9 together form the functional controller 11 of the machine 2. The user selects the required operating sequences for the machine 2 by means of the control panel 5. The user input is transmitted by means of the bus 1 to the computer unit 9, is evaluated by the computer unit and converted into control commands which in turn are transmitted by means of the bus 1 to the corresponding actuators of the machine 2. The computer unit 9 also evaluates sensor information received by the machine 2 by means of the bus 1, and sends display information to the control panel 5. The arrangement of the elements which co-operate for the machine control system in FIG. 1 is given purely by way of example and in the specialist field it is generally known that it can be implemented in the most varied manner. Depending upon the application concept, a plurality of different bus systems can also be used or wireless transmission systems can also be used.

In the context of this description, an "operating mode switching element" 3 is understood to be a switching element of which the regulating functionality acts directly on the machine 2. In FIG. 2 the operating mode switching element 3 is connected by means of a direct wiring 6' to the machine 2, so that safe control commands can be transmitted by the mode selection switching element 3 directly to the machine 2 without the signal line having to be shared with other elements, as is the case with the bus topology.

In addition to the emergency off switch 4, which because of its direct mode of action adopts a special position, the choice of the mode of operation must be transmitted in particular via a safe control means. All switching elements of which operation leads to a change of the mode of operation of the installation are regarded as mode selection switching elements. In addition to operating mode selection switches this may also be the case with two-hand control switches or enabling switches.

Because of the safety function of safe controllers, these have been designed hitherto as dedicated devices which were connected to the machine independently of the bus system by means of direct wiring. If it is necessary for the operating mode selection switch to be arranged in the region of the control panel, the additional cost for the redundant cabling can be considerable. It has also not been possible hitherto to embed safe switches as a visualization object in an interactive display, since the directly wired switch constitutes a foreign object for the virtual interface.

As can be seen in FIG. 1, the operating mode switching element 3 is, on the one hand, connected via the direct wiring 6' to the machine 2 and, on the other hand, it also has a connection to the bus 1, by means of which it can communicate with the other elements of the system. With this embodiment and with the aid of the method according to the invention it is now possible to separate the operating mode switching element 3 from the associated operating mode actuating element 3'—an operating mode selection switch in the case illustrated in FIG. 3. Thus, in this example the operating mode switching element 3 and the associated operating mode actuating element 3' enable safe control for the selection of the mode of operation. As a result the operating mode actuating element 3' can also for example be represented on a touch screen user interface as a virtual object and can be actuated by the user via this interface, as indicated in FIG. 1.

The high level of safety required for safe control is ensured by the method according to the invention, which is described below with reference to FIG. 2. FIG. 2 illustrates the individual steps of the method according to the invention in a block diagram, wherein in the following description reference is also made also to elements which are illustrated in FIG. 1.

In the step 101 an operating mode actuating element 3' is provided for a user for safe control on a user interface, for example on the display 7. This operating mode actuating element can also be arranged as a discrete operating element on the control panel 5. The actuation of the operating mode actuating element may optionally require a key or another identification means, but the clearance may also be provided on the basis of a general access and authorization concept. The operating mode actuating element may also be designed as an interactive virtual object, for example in the case of a touch screen display, on which the operating mode actuating element 3' can be actuated by touching the touch-sensitive screen. In this way it is possible to provide the switching element only if the situation necessitates this and the necessary authorization is present. For example, a two-hand control switch, for instance in the form of two spaced-apart buttons, are only displayed superimposed on the screen if the operating sequence necessitates the operation of this switch.

In step 102 a user input, on the basis of which the configuration of the operating mode switching element 3, and as a result the mode of operation of the machine 2, is to be changed, is received on the user interface. This can take place, for example, by turning the operating mode selection switch or by touching the corresponding virtual object or the corresponding virtual objects on the touch screen.

In step 103 the data of the selected change of configuration are secured. The securing can take place either in a discrete storage element of the control panel 5 or in another storage unit, such as for instance the storage unit 10 of the computer unit 9 illustrated in FIG. 1. On the one hand, the data are stored in order to be available for the later step of checking, and, on the other hand, the stored data could be used as log files.

In step 104 the data for the selected change of configuration are transmitted by the functional controller 11 via the bus 1 to the operating mode switching element 3. In order to exclude faulty signaling, however, the selected configuration is not immediately adopted by the operating mode switching element 3, but first a security question is generated.

For this purpose, in step 105 the operating mode switching element 3 transmits the received data (or data corresponding thereto, from which the received change of configuration is apparent) back to the functional controller 11.

In step 106 a check is carried out as to whether the change of configuration, which in step 105 was transmitted by the operating mode switching element 3 back to the functional controller 11, corresponds to the change of configuration which was stored in step 103 and in step 104 was transmitted to the operating mode switching element 3.

This step may optionally also require a user input, if this is desirable on account of the security protocol. In this case a request for confirmation of the user input is displayed on the display 7. Depending upon the requirement, this request may be displayed in various ways, for instance in the form of a pop-up window or as a virtual operating element, which appears on an interactive user interface, or also by the illumination of a button. In the case of the above-mentioned two-hand control switch, the confirmation request could also be signaled for example by changing the color of the spaced-apart operating areas just actuated and having to actuate them again, or by changing the position of the operating areas (moving them to another location) so that the hands have to follow them. Thus, the user can confirm the confirmation request on the user interface in any way, for example by actuating a button, by clicking on a key or touching a control panel, through a gesture or any other way known in the prior art.

In step 107 the confirmation is transmitted to the operating mode switching element 3. Thus the operating mode switching element 3 ensures that the signaled amendment change of the configuration was neither inadvertent nor a signaling error.

In step 108 the operating mode switching element 3 adopts the selected configuration, wherein this is signaled directly to the machine 2 via the direct wiring 6' and the machine is changed to the new mode of operation.

Then the method can be begun again at step 101, wherein depending upon the requirement and the embodiment the operating mode actuating element is either constantly available or is only made available on the basis of specific prerequisites.

The invention claimed is:

1. A method for actuating an operating mode switching element of an installation by a safe control operation, wherein the installation has a functional controller and communication connections, and wherein the functional controller has a storage unit, a control apparatus, a display and a user interface, the method comprising:
   receiving a user input to change the operating mode of the installation via an operating mode actuating element provided on the user interface;
   storing data related to the change of operating mode in the storage unit;
   transmitting the data related to the change of operating mode to the operating mode switching element;

transmitting the data related to the change of operating mode from the operating mode switching element back to the functional controller;

checking whether the data related to the change of operating mode that has been transmitted back corresponds to the stored data related to the change of operating mode;

transmitting a confirmation to the operating mode switching element; and changing the operating mode of the installation via the operating mode switching element;

wherein, the checking further includes an approval of the confirmation to the operating mode actuating element by the functional controller on a basis of a general access and authorization concept, in which, upon reception of at least one of the user input and/or the confirmation to the operating mode actuating element, an identity check of the user is carried out.

2. The method according to claim 1, wherein the operating mode actuating element is provided on the user interface only when a situation necessitates and necessary authorization is present.

3. The method according to claim 1, wherein an operating mode selection switch, a two-hand control switch or an enabling switch is on the user interface as the operating mode actuating element.

4. The method according to claim 1, wherein the user interface comprises a plurality of parts and at least parts of the plurality of parts of the user interface are displayed on the display as visualization elements.

5. The method according to claim 4, wherein the operating mode actuating element is displayed as a visualized element on the display.

6. The method according to claim 1, wherein the checking further includes:
  displaying a request to confirm the user input on the display; and
  receiving a confirmation from the user via the user interface.

7. The method according to claim 6, wherein the request to confirm the user input is a visualized element, which is displayed spatially offset from the operating mode actuating element.

8. The method according to claim 1, wherein an installation visualization is displayed on the display.

9. The method according to claim 1, wherein at least one of the communication connections uses a bus protocol.

10. The method according to claim 1, wherein the operating mode actuation element is actuated on the basis of the general access and authorization concept.

* * * * *